No. 758,658. Patented May 3, 1904.

UNITED STATES PATENT OFFICE.

CHARLES JACOBS, OF NEW YORK, N. Y.

COMPOUND FOR COATING BRICKS, PLASTERING, &c.

SPECIFICATION forming part of Letters Patent No. 758,658, dated May 3, 1904.

Application filed February 3, 1904. Serial No. 191,871. (No specimens.)

*To all whom it may concern:*

Be it known that I, CHARLES JACOBS, a resident of New York city, Manhattan borough, county and State of New York, have invented a certain new and useful Compound for Coating Bricks, Plastering, and the Like, of which the following is a specification.

My invention relates to compounds for coating bricks, plastering, and the like, and has for its object to produce an efficient and inexpensive compound of this character which will render the objects upon which it is applied water and moisture proof and whereby in particular the saltpeter contained in bricks and plaster commonly used, which sooner or later, to a greater or lesser extent, permeates to the surface thereof through the action of the atmosphere, will no longer appear after my improved compound is applied thereto.

In producing my new composition I take about one-half pint of caustic soda, about one-half pint of nitric acid, about one-half pint of muriatic acid, about one-half pint of tartaric acid, and about one-half pint of sugar of lead and thoroughly mix the same together, and I then pour this mixture in about one gallon of ordinary commercial varnish and slowly stir the whole mixture; but in place of the varnish I may use a vegetable oil, such as boiled linseed-oil.

The solution of caustic soda may consist of one part of caustic soda to ten parts of water; but this may be varied.

The resultant product can readily be applied upon and firmly adheres to brick, plaster ceilings, walls, and the like and will when applied efficiently protect the same against the action of the atmosphere, thereby preventing the appearance of the saltpeter usually contained in bricks and plastering to a greater or lesser extent and acting as a moisture-proof coating therefor. This coating may thereafter be painted in the usual manner, and wall-paper may also be applied thereto, in which case the deleterious action of the saltpeter in said plastering or bricks is obviated.

Having now described my invention, what I claim, and desire to secure by Letters Patent, is—

1. The composition of matter for coating bricks, consisting of the compounds formed by mixing caustic soda, acids and sugar of lead mixed with oil substantially as set forth.

2. A composition of matter for coating bricks, consisting of the compounds formed by mixing caustic soda with nitric acid, muriatic acid, tartaric acid and sugar of lead, mixed with oil in substantially the proportions stated.

CHARLES JACOBS.

Witnesses:
SAMUEL SWANSON,
HENRY STORCK.